(12) United States Patent
Pattan et al.

(10) Patent No.: US 9,912,809 B2
(45) Date of Patent: Mar. 6, 2018

(54) SYSTEM AND METHOD FOR ENHANCING USER EXPERIENCE DURING INTERACTIVE AUDIO VISUAL COMMUNICATION

(71) Applicant: Samsung Electronics Co., Ltd., Suwon-si, Gyeonggi-do (KR)

(72) Inventors: Basavaraj Jayawant Pattan, Bangalore (IN); Suresh Chitturi, Bangalore (IN); Ashok Kumar Selvaraj, Pondicherry (IN); Gyubong Oh, Suwon-si (KR); Kyung Tak Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 14/832,267

(22) Filed: Aug. 21, 2015

(65) Prior Publication Data

US 2016/0057383 A1 Feb. 25, 2016

(30) Foreign Application Priority Data

Aug. 21, 2014 (IN) ............................ 4106/CHE/2014
Sep. 8, 2014 (IN) ............................ 4395/CHE/2014
Aug. 20, 2015 (IN) ............................ 4106/CHE/2014

(51) Int. Cl.
*H04N 7/14* (2006.01)
*H04M 3/493* (2006.01)

(52) U.S. Cl.
CPC .... *H04M 3/4938* (2013.01); *H04M 2203/252* (2013.01); *H04M 2203/253* (2013.01)

(58) Field of Classification Search
CPC ......... H04M 3/4938; H04M 2203/252; H04M 2203/253
USPC ................... 348/14.01–14.16; 370/351–357; 379/67.1–88.28, 201.01; 709/201–207, 709/217–248
See application file for complete search history.

(56) References Cited

U.S. PATENT DOCUMENTS

| 6,418,199 B1 * | 7/2002 | Perrone ............. G06F 17/30663 379/88.01 |
| 8,548,135 B1 | 10/2013 | Lavian et al. |
| 2003/0162561 A1 * | 8/2003 | Johnson ................ G06F 9/4443 455/553.1 |
| 2006/0285662 A1 | 12/2006 | Yin et al. |
| 2007/0026852 A1 | 2/2007 | Logan et al. |

(Continued)

*Primary Examiner* — Hemant Patel
(74) *Attorney, Agent, or Firm* — Jefferson IP Law, LLP

(57) ABSTRACT

The embodiments of the present invention disclose a system and method for enabling Enhanced Visual Calls (EVC). The system includes an EVC client provided in a User Device to access network-based EVC functional components and device-based functional components to enable a user to request for EVC services, and an EVC server configured for authentication and processing of one or more EVC service requests received from the EVC client, accessing an EVC XML Document Management Server (XDMS) for retrieving a visual web content and an audio content related to the received one or more EVC service requests, synchronizing the visual web content with the audio content to provide the EVC client with a visual Interactive Voice Response (IVR) menu related to the audio content, and transmitting, to the EVC client, the visual IVR menu related to the one or more EVC service requests for displaying at the user device.

20 Claims, 5 Drawing Sheets

(56) References Cited

U.S. PATENT DOCUMENTS

| | | |
|---|---|---|
| 2007/0294354 A1* | 12/2007 | Sylvain ............ H04L 29/06027 |
| | | 709/206 |
| 2008/0065715 A1 | 3/2008 | Hsu et al. |
| 2010/0087175 A1 | 4/2010 | Roundtree et al. |
| 2011/0293078 A1* | 12/2011 | Saylor .................. H04M 3/493 |
| | | 379/88.13 |
| 2012/0257002 A1 | 10/2012 | Stocker |
| 2013/0078970 A1 | 3/2013 | Rotsztein et al. |
| 2016/0036973 A1* | 2/2016 | Harasimiuk ............ H04L 51/32 |
| | | 379/265.13 |

* cited by examiner

SYSTEM AND METHOD FOR ENHANCING USER EXPERIENCE DURING INTERACTIVE AUDIO VISUAL COMMUNICATION

CROSS-REFERENCE TO RELATED APPLICATION(S)

This application claims priority under 35 U.S.C. 119(a) to applications filed in the Indian Patent Office on Aug. 21, 2014, Sep. 8, 2014, and Aug. 20, 2015, and Indian Provisional Application Nos. 4106/CHE/2014 and 4395/CHE/2014, and Indian Non-provisional Patent Application No. 4106/CHE/2014 respectively, the contents of which are incorporated herein by reference.

TECHNICAL FIELD

The present invention claims benefit of the Indian Provisional Application Nos. 4106/CHE/2014 titled "SYSTEM AND METHOD FOR ENHANCING USER EXPERIENCE DURING INTERACTIVE AUDIO-VISUAL COMMUNICATION" by Samsung R&D Institute India—Bangalore Private Limited, filed on 21 Aug. 2014 and 4395/CHE/2014 titled "SYSTEM AND METHOD FOR ENHANCED VISUAL CALL EXTENSIONS" by Samsung R&D Institute India—Bangalore Private Limited, filed on 8 Sep. 2014, which is herein incorporated in its entirety by reference for all purposes.

BACKGROUND

The present invention relates to Interactive Voice Response (IVR) communication systems and methods and particularly relates to visual call enhancements in IVR systems. The present invention more particularly relates to enhancing user experience by providing interactive audio visual calls in IVR systems.

Interactive voice response (IVR) is a technology that allows a computer or a machine to interact with humans through the use of voice and dual-tone multi-frequency signaling (DTMF) keypad inputs. IVR systems are typically used to service high call volumes, reduce cost, and improve customer experience. Examples of typical IVR applications are telephone banking, televoting, and credit card services. Companies also use IVR services to extend their business hours to 24/7 operation.

Interactive Voice Response (IVR) technology is generally used to detect voice and key inputs from a caller. The advent of Interactive Voice Response (IVR) systems has reduced operating costs for many types of businesses for providing services. Generally, IVR systems allows a user to interact with an audio or visual response system. The IVR systems can provide prompts to a user and receive touch tone and/or spoken responses on the prompts from the user. Through such IVR dialogue the system collects sufficient information about the user to direct the call to the most appropriate resource, information processing system or the like.

Typically, the caller calling the destination may have to listen and follow instructions on the menu to get a desired response or a function performed. Therefore, the process can be time consuming. Moreover, in case the caller provides an incorrect input, the complete process may have to be repeated. Further, the communication experience in existing art is limited, as the user has limited information about a call recipient at the other end, when the user initiates a communication. Similarly the recipient of the call also has limited information about the caller at the time of receiving the call.

Another problem faced in current communication technologies is lack of visual interface for the Enterprise IVR system and lack of visual interactivity with the Enterprise representative on the call.

Consider a scenario, where a user is attempting to establish a call and browse data on a user equipment (UE), wherein browsing data on the UE includes, but not limited to, browsing web pages, accessing applications, and the like. As both call and web browsing are different processes, they need to be accessed independently. According to the existing technologies, it is difficult for the user to use call and data at the same time even if they are related to each other, as both the call and web browsing are accessed on different interfaces. This indeed leads to limiting the user experience.

Further, currently only interactive voice response feature is available to the user, wherein whenever the uses wishes to opt for any services, the user can establish a call with the particular destination, list of options are announced from the destination in audio format, the user has to give response to the output audio in the form of pressing given option numbers and the particular service will be rendered. But, currently there are no methodologies and systems available that can provide interactive visual response (IVR) to the user, wherein the user can establish a voice call with the particular destination, view the options on the display of the UE by browsing the data, select the option from his UE and access the services.

In view of the foregoing, there is need for a system and method that enables exchange of customized information between the caller and the called party. Further, there is need for a system and method that addresses lack of visual interface visual interactivity in IVR systems.

The above mentioned shortcomings, disadvantages and problems are addressed herein and which will be understood by reading and studying the following specification.

SUMMARY

The various embodiments of the present invention disclose a system and method for enabling enhanced interactive visual calls by providing customized information exchange between the called party and caller. The invention particularly relates to visual call enhancements in IVR systems, including, but not limited to, peer to peer call enhancements, interactions with Enterprise IVR systems, and audio visual interactive calls.

Accordingly, embodiments herein disclose system for enabling Enhanced Visual Calls (EVC), the system comprising an EVC client provided in a User Device adapted to access network-based EVC functional components and device-based functional components to enable a user to request for one or more EVC services, and an EVC server adapted for authentication and processing of one or more EVC service requests received from the EVC client, accessing an EVC XML Document Management Server (XDMS) for retrieving a visual web content and an audio content related to the received one or more EVC service requests, synchronizing the visual web content with the audio content to provide the EVC client with a visual Interactive Voice Response (IVR) menu related to the audio content, and transmitting, to the EVC client, the visual IVR menu related to the one or more EVC service requests for displaying at the user device.

Further, according to an embodiment of the present invention, the EVC services comprises of, but not limited to, peer-to-peer call enhancements, interactions with enterprise IVR systems, audio-visual interactive calls, and the like.

According to another embodiment of the present invention, the EVC Client is adapted for providing, but not limited to, interaction with functional components including the EVC Server, the business clients and remote EVC Environment, interaction with supporting clients available on the device such as a call client, a Web Client, and the like.

According to another embodiment of the present invention, the system further comprises one or more supporting EVC enablers for serving EVC service related requests and responses including, but not limited to, a Call Client, a Web Client, a CPM Enabler for providing communication capabilities to support interactions between the EVC Users and push capabilities, an XDM Enabler for providing XML document management capabilities to support creating, storing and managing the user preferences and service provider policy, a DM Enabler for providing device management to support remote management of EVC-specific device parameters, a Presence Enabler for enabling retrieving and publishing of the user's presence information, a CAB Enabler for providing the management capabilities about the user's PCC information and communication history to the EVC Enabler, an MMTel Service for providing multi-media call functions for the EVC users, and the like.

According to another embodiment of the present invention, the EVC Server is adapted for providing at least one of, but not limited to, synchronization of interactive audio and visual web contents, delivery Web URLs to the EVC Client, redirecting call to connect the Business Client for interaction between the EVC Users and businesses, retrieving service number content for the EVC User, storing the EVC service history, and the like.

According to another embodiment of the present invention, the EVC server further comprises of, but not limited to, a mapping function adapted for performing a one-to-one mapping of the web content and the audio content to synchronize the web content and the audio content of the EVC service, a configuration management function to handle the EVC service configuration parameters stored in EVC XDMS. in accordance with the Business requirements, and the like.

According to another embodiment of the present invention, the EVC XDMS comprises of, but not limited to, a configuration document comprising, but not limited to, one or more call handling instructions configured by the business to provide to the EVC Server for the requests made by the EVC Client, specific EVC extensions such as initial web and audio URLs and related content required for the launch of EVC service, and the like, a mapping document comprising a one-to-one mapping of the web content and the audio content, one or more EVC enabler related application usages, and the like.

According to another embodiment of the present invention, the system further comprises a plurality of content servers including, but not limited to, web servers which provides access to social networking activities to the EVC server, IVR server adapted for delivering IVR voice content to Call Handling Client, receiving and handling DTMF/voice input from Call Handling Client, returning the corresponding voice, and the like.

According to another embodiment of the present invention, the system further comprises a plurality of interfaces providing data communication between the functional components of the EVC system, comprises of, but not limited to, an if6 interface which allows the Business Client to store EVC configuration, EVC-specific profile information, rich information and mapping information between web content and audio content, an EVC-1 interface which allows the EVC Client to interact with the EVC Server for delivery of call information to the user, retrieval of landing page URL for Visual IVR set up, retrieval of Next Menu URLs corresponding to DTMF/Voice input, and retrieval of Next Menu DTMF/Text corresponding to Web input, an EVC-2 interface which allows interaction between the EVC Server and the EVC XDMS for retrieving and managing EVC specific information stored in the EVC XDMS, and an EVC-3 interface which allows interaction between the EVC Server and the Business Client for the handling the interactions such as call handling, interactive web or web document sharing functionality.

Embodiments herein further disclose a method for enabling Enhanced Visual Calls (EVC) in an Interactive Voice Response (IVR) system, the method comprises steps of receiving, by an EVC server, a request related to a content associated with an EVC service from an EVC client during an active call, accessing, by the EVC server, an EVC XML document management server (XDMS) for retrieving interactive web content and audio content related to the received request, synchronizing the web content with the audio content to generate one or more visual Interactive Visual Response (IVR) menus and the EVC client requested web page and transmitting the interactive visual IVR menu to be displayed to the EVC client.

According to another embodiment of the present invention, wherein the active call is one of a Circuit Switch (CS) call or a Packet Switch (PS) call.

The foregoing has outlined, in general, the various aspects of the invention and is to serve as an aid to better understanding the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

BRIEF DESCRIPTION OF THE DRAWINGS

The other objects, features and advantages will occur to those skilled in the art from the following description of the preferred embodiment and the accompanying drawings in which.

Although specific features of the present invention are shown in some drawings and not in others. This is done for convenience only as each feature may be combined with any or all of the other features in accordance with the present invention.

DETAILED DESCRIPTION

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

The present invention provides a method and apparatus for enabling customized information sharing about the contact being called and the caller visual call experience. Specifically, the invention relates to visual call enhancements including, but not limited to, peer to peer rich call enhancements, interactions with Enterprise IVR systems, and audio visual interactive calls. Peer-to-Peer rich call enhancements may one or more of hybrid voice and real-time text conversations, profile and social information sharing during the call, and other types of rich call experience scenarios. The Enhanced Visual Call (EVC) apparatus comprises of functional components and the interfaces/reference points used or exposed by these functional components, and is realized using a client-server concept as depicted in FIG. 1.

Figure 1:
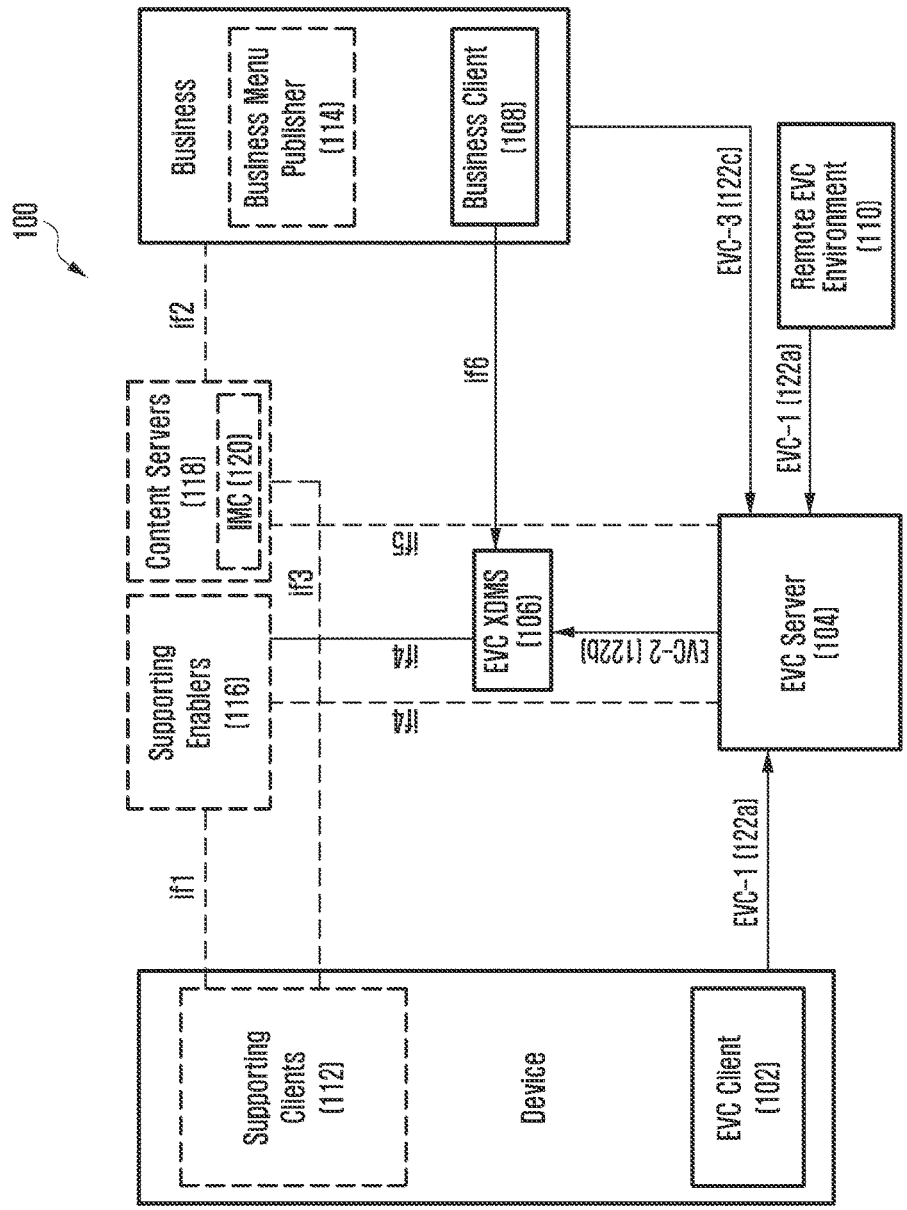
FIG. 1 is an architectural diagram of a system for enhancing user experience during interactive audio-visual communication, according to an embodiment of the present invention.

FIG. 1 is a block diagram illustrating architecture of a system 100 for enhancing user experience during interactive audio-visual communication, according to an embodiment of the present invention. The functional components of the system 100 comprises of an EVC client 102, an EVC server 104, an EVC XML Document Management Server (XDMS) 106, one or more External Content Servers 118 and Interfaces 122a-122c.

The EVC Client 102 allows the EVC User to consume an EVC service by interacting with other functional components such as the EVC Server 104, one or more Business Clients 108, and Remote EVC Environment 110. The EVC Client 102 may further use other supporting clients 112 e.g., XML Document Management (XDM), Converged IP Messaging (CPM), Converged Address Book (CAB), Device Management (DM), Call (MMTEL, CS Call), Social Networking (SN), and Web, for realizing EVC service functionalities. The EVC Client 102 may be involved in the following high level functionalities including
    SIP/IP core related communication
        Registration of the EVC Client
    Client-side EVC service logic execution
        Correlation of EVC Call Enhancement data (e.g., links, ID), visual data (e.g., web page, content) with the call
        Correlation of EVC IVR data (e.g., link mapped to landing page IVR, link mapped to next menu IVR) with the IVR call
    Generating and sending request to transfer EVC data
    Receiving and processing EVC data
    Communication internal to the Device with the supporting Enablers clients.

The supporting clients 112 of the EVC Client 102 comprises of a Web Client and a call client as its functional components. The Web Client is responsible for rendering and interacting with the visual web content associated with the EVC service. The Call Client is responsible for rendering and interacting with the audio content of the EVC service which may be either a Packet-Switched (PS) or Circuit-Switched (CS) call. The web client and the call client components may further interact with each other e.g., Call client notifying EVC Client 102 about the menu item selection, Web Client notifying the EVC Client 102 about the Page URI that is being rendered, such that the EVC Client 102 core may take appropriate actions.

The EVC Server 104 is the central network entity for receiving and responding to requests from the EVC client 102. The EVC Server 104 is mainly responsible for synchronization of interactive audio and visual web contents, delivering Web URLs to the EVC Client 102. The EVC Server 104 includes core logic required to authorize and authenticate all the requests, handle EVC Client 102 registration, ensure data integrity and confidentiality and user privacy, enable peer to peer call enhancements such as exchange of rich content between the EVC users. The EVC Server 104 further include a Mapping function, which contains the necessary logic to provide and one-to-one mapping of web content and audio content, which allows the Internet Mediated Communication (IMC) protocol to maintain the web and audio portions of the EVC service content synchronized. The EVC Server 104 may also include a configuration management function to handle the EVC service configuration parameters in accordance with the business requirements, which may be stored in the EVC XDMS 106. The EVC Server 104 may also interacts with the EVC XDMS, for retrieving IVR mapping information, the External Content Servers and the Supporting Enablers e.g., XDM, DM etc., for handling EVC Client requests.

The EVC XDMS 106 comprises of Configuration, Mapping, Profile, Rich related information/documents. The Configuration document contains the call handling instructions configured by the Business to the EVC Server 104 for the requests made by the EVC Client 102. The configuration document may also include specific EVC extensions such as the initial web and audio URLs, among other content required for the launch of EVC service. With this initial content available to the EVC user, the user will be able to interact and navigate forward to the subsequent menus. The mapping document contains the one-to-one mapping of the web content and the audio content. The mapping can be described as URLs to the stored web and audio content through which EVC Server 104 via IMC can retrieve the corresponding content. The EVC XDMS 106 may further include one or more Application Usages representing the functionality described herein.

The content severs 118 mainly refers of external third party servers such web servers and IVR servers. The web servers (SNS/web pages) provides social networking activities e.g., feeds, to the EVC system when requested by the system. The Web Servers is adapted to store SNS/Web page contents, ensuring data integrity and confidentiality, handling of authentication and authorization to Web/SNS content and providing access to Web/SNS content through HTTP-based interface e.g. Contents Handling Client. The IVR Servers is adapted to deliver IVR voice content to Call Handling Client and receive and handle DTMF/voice input from Call Handling Client and return the corresponding voice.

The EVC system 100 further comprises one or more supporting enablers 116 such as XDM, CPM, CAB, MMTel, Web, DM adapted for serving EVC service related requests and responses. For example, MMTel may be used for call handling, which can then be routed to EVC Server 104 based on EVC identifier for performing EVC service specific actions. Similarly, CPM may be used for delivering push message notifications to EVC Client 102 coupled with a CPM Client.

The EVC system 100 further comprises a Remote EVC Environment 110, which is same as EVC Client 102 residing in the terminating network. The business client 108 as shown in FIG. 1 is same as an EVC Client 102 residing in a business domain. However depending on whether the user behind EVC Client 102 is the Business representative or the normal EVC User, the privileges defined at the network for carrying out certain functionalities may vary e.g., Business Client 108 may have access to the same Web Pages being accessed by the EVC User or the EVC Client 102.

The plurality of interfaces comprises of an if6, EVC1 122a, EVC-2 122b and EVC-3 122c. The if6 represents the interface for the Business Client 108 to store EVC configuration. The interface allows a business entity using an XDMC to manage its own XML Documents stored in the EVC XDMS 106, once the necessary authentication is performed.

EVC-1 122a represents the interface between EVC Client 102 and EVC Server 104. The EVC-1 122a interface supports the following functionalities including, but not limited to, authentication and authorization of the EVC User; delivery of: Call information; Links to rich content stored in the network (e.g. enriched call information); Reference/ID to content as a result of EVC user interaction (e.g. reference to order information) and Real-time Message, retrieval of landing page URL for Visual IVR set up; retrieval of Next Menu URLs corresponding to DTMF/Voice input, retrieval of Next Menu DTMF/Text corresponding to Web input, Handling information related to multiple devices, and the like.

EVC-2 122b represents the interface between EVC Server 104 and EVC XDMS 106. The interface defines the interactions necessary for managing EVC specific documents such as Mapping, Configuration, Profile, Rich Info, etc. stored in EVC XDMS 106. The EVC-2 11b allows the EVC Server 104 to retrieve XML Documents stored in the EVC XDMS 106 and a trusted entity i.e. EVC Server 104 using an XDMA to retrieve XML Documents stored in the EVC XDMS 106. The protocol used for EVC-2 may be XCAP or RESTful HTTP.

EVC-3 122c represents the interface between EVC Server 104 and the Business Client 108 for the handling the interactions specific to business clients such as call handling, interactive web or web document sharing functionality and other functionalities similar to EVC-1 122a. The supported protocols may include HTTP, SIP and WebRTC.

Figure 2:
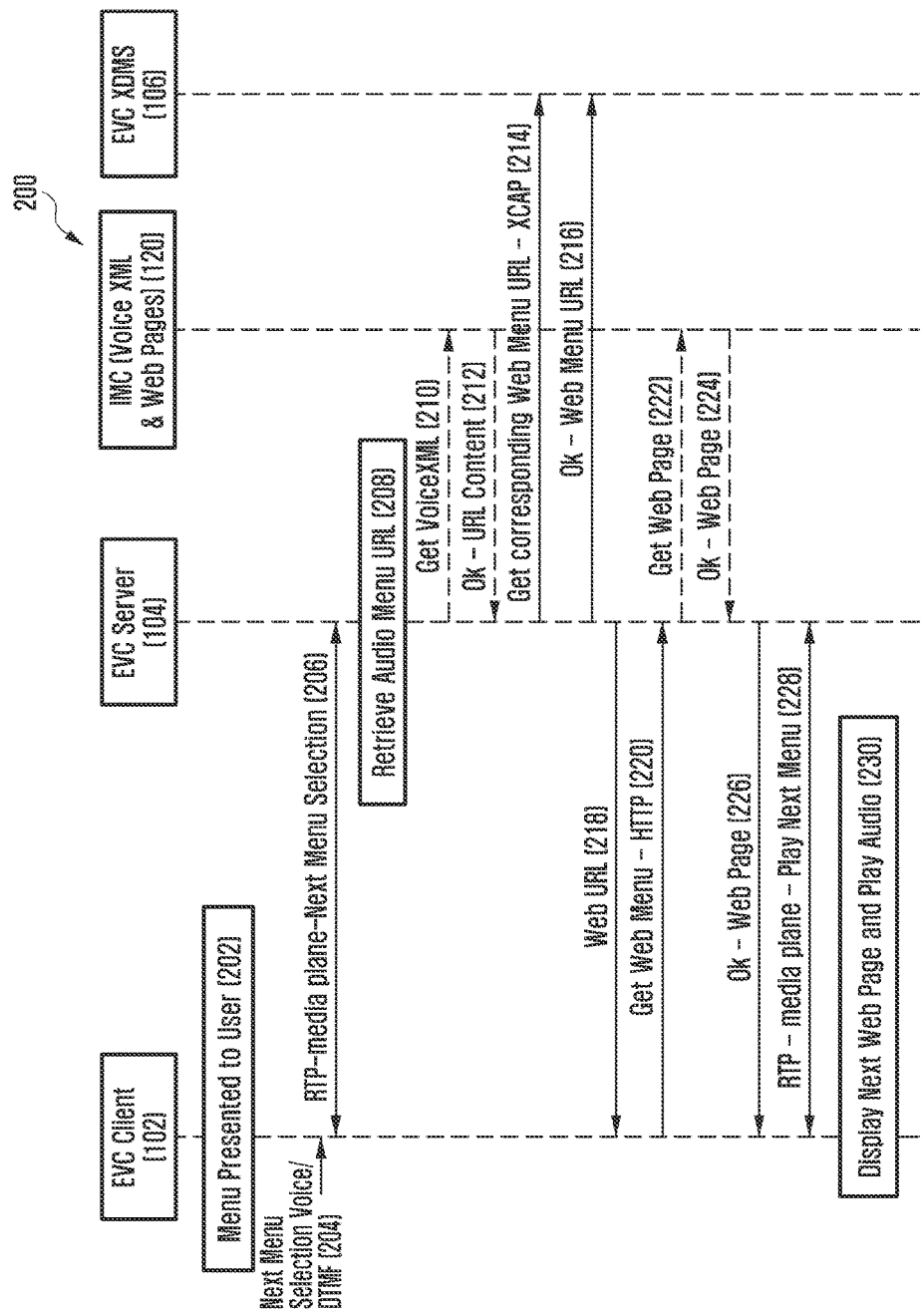
FIG. 2 is a flow diagram illustrating selection of next menu in a visual interactive voice response (IVR) system, according to an embodiment of the present invention.

FIG. 2 is a flow diagram 200 illustrating selection of next menu in a visual interactive voice response (IVR), according to an embodiment of the present invention. At step 202, the EVC client 102 receives the Home Page Web Menu and the corresponding Audio Menu and is presented to the EVC Client 102 as shown in FIG. 2. At step 204, the EVC client 102 indicates selection of audio/voice or DTMF from the received menu items, towards the EVC Server 104 in the existing media channel. At step 206, the EVC server 104 next media selection done by EVC client 102 using real-time transport protocol (RTP). At step 208, the EVC server 104 retrieves the menu item selected by the EVC server. The EVC server sends an error message on the media channel if EVC User has entered an incorrect choice. If the EVC user choice is correct, then at step 210, the EVC server 104 requests IMC 120 to provide the VoiceXML content corresponding to the user selection at step 204. Here IMC 120 is a VoiceXML ad Web Pages storage database. At step 212, the EVC Server receives the VoiceXML content corresponding to the selection from the IMC 120. Further, at step 214, the EVC Server 104 retrieves Web Menu URL corresponding to the Audio Menu URL by contacting EVC XDMS 106 e.g., from Mapping document (via XCAP). At step 216, the web URL of next menu is then pushed to the EVC server 104, and the same can be pushed to the EVC Client 102 in a separate request e.g., SIP PUSH or MESSAGE by the EVC server 104 at step 218. At step 220, the EVC Client 102 requests EVC Server 104 for the Web Page corresponding to the next Web Menu URL received and is delivered to EVC Client 102. At step 222, the IMC 120 retrieves the Web Page from the VoiceXML and Web Pages database storage and at step 224, transmits the VoiceXML content to the EVC server 104. The EVC server 104 converts the VoiceXML to an audio form and at step 226, transmits the web page over the established media plane towards the EVC Client 102. At step 228, the herein above mentioned steps iterates every time the EVC client 102 requests for next menu. At step 230, the EVC Client 102 displays the Web Menu along with the corresponding audio menu being streamed.

Figure 3:
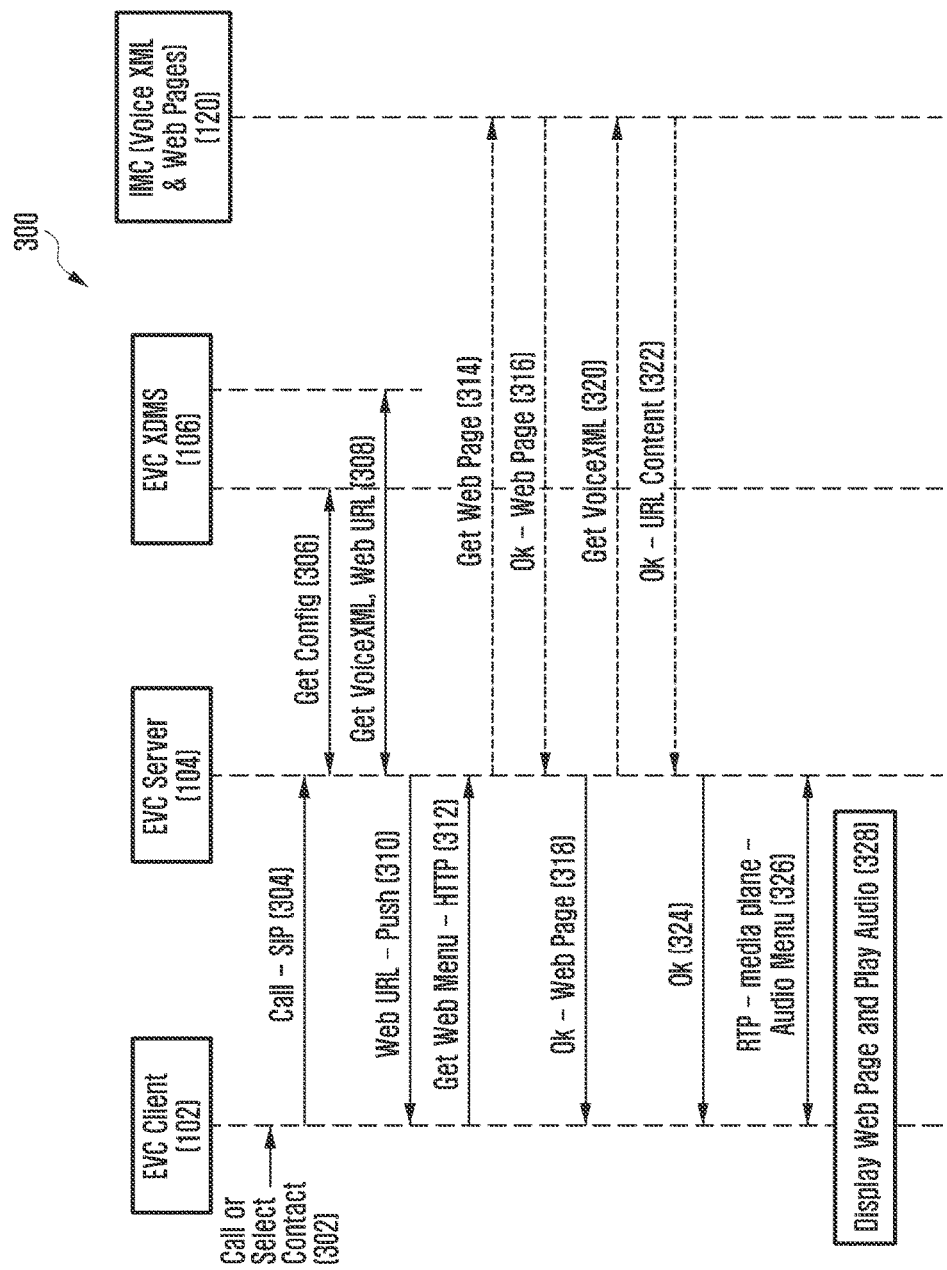
FIG. 3 is a flow diagram illustrating setup of a visual IVR system, according to an embodiment of the present invention.

FIG. 3 is a flow diagram 300 illustrating a first menu retrieval-audio and web menu delivery for an IVR system, according to an embodiment of the present invention. The scenario is where EVC User/Client 102 has either placed a call or selected a contact as shown in step 302 of FIG. 3. At step 304, the EVC Client 102 initiates a call towards a business entity which lands on EVC Server 104. At step 306, the EVC Server 104 then retrieves the service configuration from EVC XDMS 106 and determines whether the call should be rendered as normal voice call or Interactive Voice Response (IVR) or visual IVR. If it is visual IVR call, then at step 308, VoiceXML URL and Web page URL is retrieved from EVC XDMS 106 e.g., either from Configuration document or from Mapping document. At step 310, the EVC Server 104 pushes the Web URL corresponding to the Audio Menu UR. At step 312, The EVC client 102 then requests the EVC server 104 to fetch the content available at the Home Page Web Menu URL. At step 314, the EVC server 104 in turn transmits the request to the IMC 120. At step 316, the IMC 120 obtains the web pages from the database storage (e.g., XDMS) and returns to EVC server 104. At step 318, the EVC server 104 further transmits requested webpages to the EVC Client 102. At step 320, the EVC Server 104 then retrieves the VoiceXML content by sending VoiceXML URL corresponding to the Audio Menu URL to the IMC 120. At step 322, the IMC 120 transmits the VoiceXML URL content to the EVC server 104, wherein at step 324, the server further transmits information to the EVC client 102. A Media plane is then setup between the EVC Server 104 and the requested EVC Client 102. At step 326, the VoiceXML content is then converted audio menu form and is transmitted over the established media plane from EVC server 104 to the EVC client 102. At step 328, the EVC Client 102 displays the Web Menu content along with the corresponding Audio Menu content being streamed.

Figure 4:
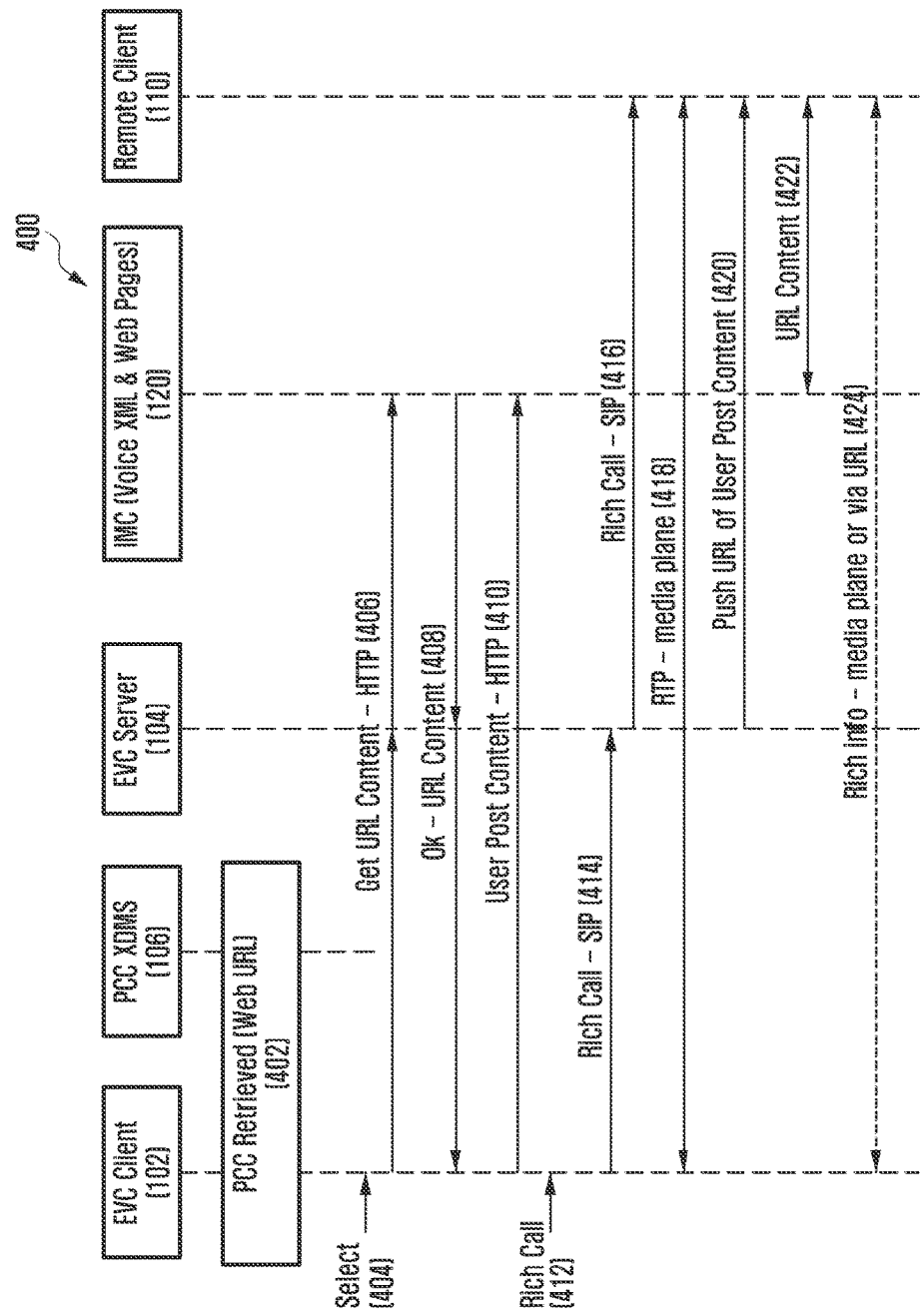
FIG. 4 is a block diagram illustrating a use case of performing web browsing and calling on a user device, according to an embodiment of the present invention.

FIG. 4 is a flow diagram 400 illustrating a web-call scenario, according to an embodiment of the present invention. The scenario is where EVC User is browsing web content offered by the EVC service and the web content includes an option for the EVC User to make call. At step 402, the EVC Client 102 has retrieved and synchronized contact card from PCC XDMS 106 which includes Home Page Web URL. At step 404, EVC client 102 selects a particular client for contacting. Upon selecting the contact by the EVC User, at step 406, the EVC Client 102 requests the IMC 120 (via EVC Server) to fetch the content available at the Home Page Web URL. At step 408, the IMC 120 obtains the web pages from the VoiceXML and Web Pages database storage (e.g., XDMS) and returns content to the requested EVC Client 102. At step 410, the EVC client collects the EVC User's action on the web page and posts to the IMC hosted web pages. Upon request from the EVC User to make a call as selected on the Web Page, at step 412, the EVC Client 102 places a Rich Call (e.g., via SIP INVITE) towards the Remote Client 110, which could be a Business Client. At step 414, the rich call is received by the EVC server 104, and further, at step 416, the rich call can be transmitted from the EVC server 104 to the remote client 110. At step 418, The RTP media plane is established to exchange media between EVC User and the Remote Client 110. At step 420, the EVC Server 104 then pushes the URL for the EVC User posted content towards the Remote Client 110. At step 422, the Remote client 110 fetches the URL contents to display during the call with EVC User. Alternately, at step 424, the media plane for the Rich Call apart from media path for carrying communication payload there can be another media path for carrying any rich info that has been selected by the EVC User.

Figure 5:
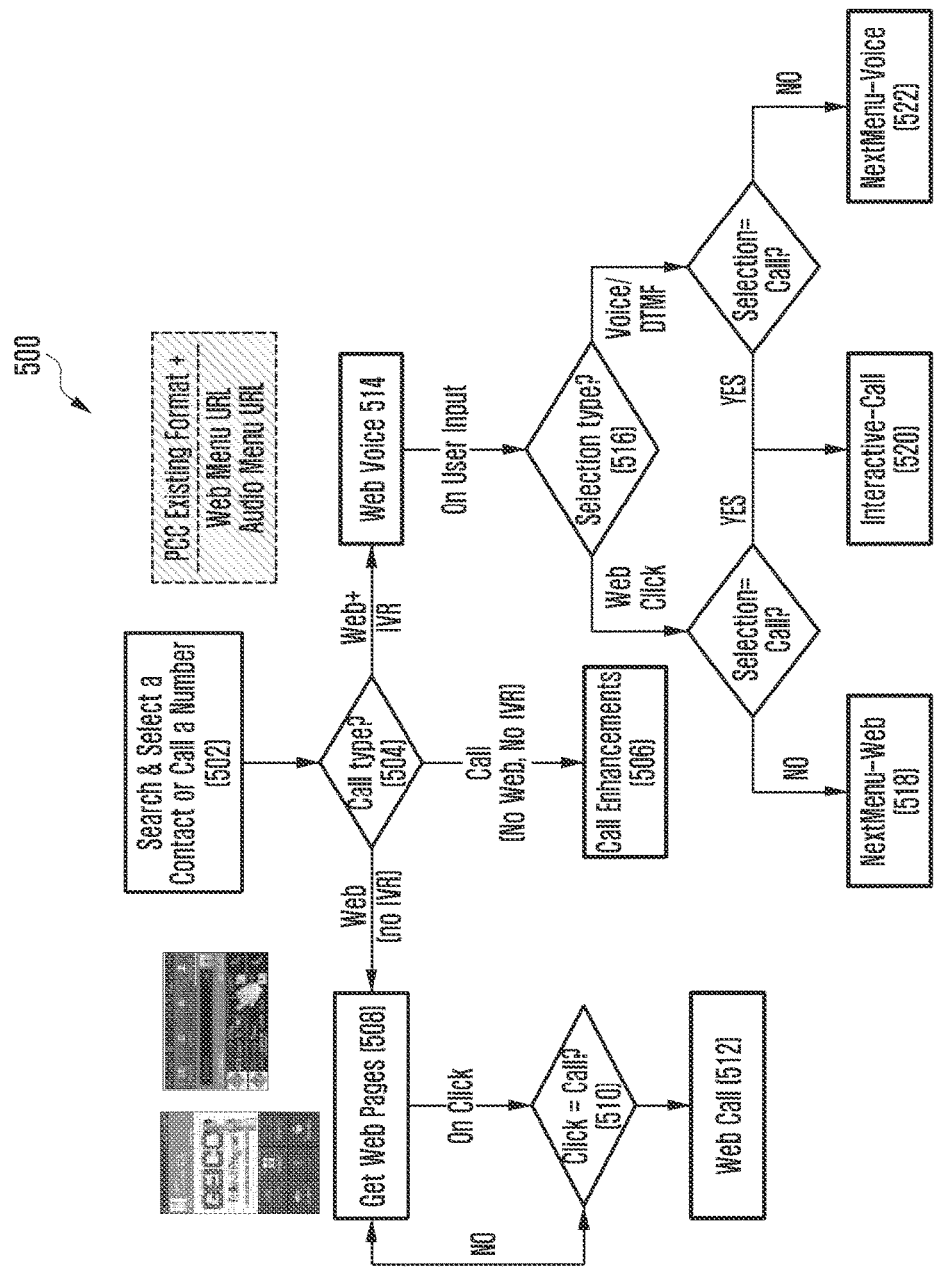
FIG. 5 is a schematic flow diagram illustrating a logical flow of EVC client interaction model and the resulting usage scenario, according to an embodiment of the present invention.

FIG. 5 is a schematic flow diagram illustrating an overall logical flow of EVC client interaction model and the resulting usage scenario, according to an embodiment of the present invention. At step 502, the EVC client receives a request from an EVC user to search and select a contact or place a call for the selected contact. The resulting usage scenario whether it is Call Enhancements or Web Call or Web Voice or NextMenu-Web or NextMenu-Voice or Interactive-Call) is primarily determined by the call type and any subsequent actions by the EVC User from thereon. At step 504, the EVC client checks if the request is for a call (no Web and no IVR) or not. If the request is for a call, the process accounts for Call Enhancements for example, but not limited to, Caller/Callee seeing the social networking activity of the other user on the call at the time when the call is being established or during the call, at step 506.

If the call type is Web (and no IVR), the method initiates fetching Web Pages from network e.g., using the URL pre-stored in PCC at step 508. At step 510, the system checks whether the retrieved Web Page offers EVC user to place a call or not. If the EVC user place a request for a call, then the web call for example, but not limited to, EVC User browsing web pages and making his/her selection via web or by keying the inputs before making the call to Business, is initiated at step 512.

If the call type is Web and IVR, the Web Voice for example, but not limited to, User dialing a Business number and listening to IVR options while viewing those IVR options at the same time, is imitated at step 514. During the Web-Voice scenario, at step 516, the EVC client checks if the selection is triggered by a web click or by a Voice/DTMF input. If the selection is triggered by Web Click input, then the resulting scenario is NextMenu-Web at step 518. If the selection is triggered by Voice/DTMF input, then the resulting scenario is NextMenu-Voice at step 520. Further during the Web Click input selection or Voice/DTMF input selection, if the EVC User selection is to place a call, then the resulting scenario is an Interactive-Call with, for example, but not limited to, a business representative at step 522. Embodiments as disclosed herein describes various benefits of the proposed system architecture. The value chain for enabling the Enhanced Visual Call includes the User, the Service Provider and the Business (or Individuals/Small Businesses/Large Businesses, Enterprises). The service provider hosts the Individuals/Business related profile, web pages, the voice-web interaction, interaction with external contacts and handles requests from the User and provides responses related to all of the above.

The user benefits includes, but not limited to, getting relevant information immediately, richer user experience and minimum learning curve (web interaction). The Service Provider benefits comprises of, but not limited to, increased usage of communication service; maximized usage of Yellow Pages; new business opportunities and differentiated service over VoIP/VoLTE. The business benefits comprises of, but not limited to, higher exposure of their activities, rely on service provider for services they cannot afford, does not necessitate creation of their own apps. The architecture benefits comprises enabling a wide spectrum of usage scenarios including, but not limited to, peer to peer call enhancements, interactions with Enterprise IVR systems, and audio visual interactive calls, offering efficient and synchronized content delivery for enhanced visual call experience; and dynamic configuration capability to support multitude configurations (e.g. interaction with legacy IVR system, access to enhanced Visual IVR system, Access to Web and Call experience).

The present embodiments have been described with reference to specific example embodiments; it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

Although the embodiments herein are described with various specific embodiments, it will be obvious for a person skilled in the art to practice the invention with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

What is claimed is:

1. A method for enabling enhanced visual calls (EVC) by a terminal, the method comprising:
   receiving user selection input;
   transmitting, to an EVC server, a request message to retrieve mapping information corresponding to the user selection input from an EVC extensible markup language (XML) document management server (XDMS);
   receiving, from the EVC server, the mapping information corresponding to the user selection input retrieved from the EVC XDMS;
   receiving, from an external server, contents corresponding to the mapping information; and
   correlating the contents with an interactive voice response (IVR) call.

2. The method of claim 1, wherein if the user selection input is a next menu selection, the request message requests a next menu page uniform resource locator (URL) corresponding to the user selection input, the mapping information comprises the next menu page URL, and the contents corresponds to the next menu page URL.

3. The method of claim 1, wherein, if the user selection input is for a visual call request, the request message requests information of an IVR landing page link corresponding to the user selection input, the mapping information comprises the information of the IVR landing page link, and the contents corresponds to the information of the IVR landing page link.

4. The method of claim 1, further comprising:
   transmitting, to the external server, information of a browsed content;
   receiving information requesting enriched call with another EVC client in relation to the browsed content; and
   transmitting, to the EVC server, the information of the enriched call.

5. The method of claim 1, wherein the terminal comprises an EVC client.

6. The method of claim 2, wherein the user selection input is via at least one of dual-tone multi-frequency (DTMF) input, voice input, or web input.

7. A terminal for enabling enhanced visual calls (EVC), the terminal comprising:
   a transceiver; and
   a controller configured to:
   receive user selection input,
   transmit, to an enabling enhanced visual calls (EVC) server, a request message to retrieve mapping information corresponding to the user selection input from an EVC extensible markup language (XML) document management server (XDMS),
   receive, from the EVC server, the mapping information corresponding to the user selection input retrieved from the EVC XDMS,
   receive, from an external server, contents corresponding to the mapping information, and
   correlate the contents with an interactive voice response (IVR) call.

8. The terminal of claim 7, wherein, if the user selection input is a next menu selection, the request message requests a next menu page uniform resource locator (URL) corresponding to the user selection input, the mapping information comprises the next menu page URL, and the contents corresponds to the next menu page URL.

9. The terminal of claim 7, wherein, if the user selection input is for a visual call request, the request message requests information of an IVR landing page link corresponding to the user selection input, the mapping information comprises the information of the IVR landing page link, and the contents corresponds to the information of the IVR landing page link.

10. The terminal of claim 7, wherein the controller is further configured to:
    transmit, to the external server, information of a browsed content,
    receive information requesting enriched call with another client in relation to the browsed content, and
    transmit, to the EVC server, information of the enriched call.

11. The terminal of claim 7, wherein the terminal comprises an EVC client.

12. The terminal of claim 8,
    wherein the user selection input is via at least one of DTMF input, voice input, or web input.

13. A method for enabling enhanced visual calls (EVC) by an EVC server, the method comprising:
    receiving, from an EVC client, a first request message to retrieve mapping information corresponding to user selection input from an EVC extensible markup language (XML) document management server (XDMS);
    transmitting, to the EVC XDMS, a second request message requesting the mapping information corresponding to the user selection input;
    receiving, from the EVC XMDS, the mapping information corresponding to the user selection input; and
    transmitting, to the EVC client, the mapping information corresponding to the user selection input,
    wherein the mapping information configures the EVC client to receive contents corresponding to the mapping information from an external server.

14. The method of claim 13, wherein, if the user selection input is a next menu selection, the first request message requests a next menu page uniform resource locator (URL) corresponding to the user selection input, and the mapping information comprises the next menu page URL.

15. The method of claim 13, wherein, if the user selection input is for a visual call request, the first request message requests information of an IVR landing page link corresponding to the user selection input, and the mapping information comprises the information of the IVR landing page link.

16. The method of claim 13, further comprising:
    receiving, from the EVC client, information of an enriched call with another EVC client in relation to a browsed content; and
    transmitting, to the another EVC client, the information of the enriched call.

17. An enabling enhanced visual calls (EVC) server for enabling EVC, the EVC server comprising:
    a transceiver; and
    a controller configured to:
    receive, from an EVC client, a first request message to retrieve mapping information corresponding to user selection input from an EVC extensible markup language (XML) document management server (XDMS),
    transmit, to the EVC XDMS, a second request message requesting the mapping information corresponding to the user selection input,
    receive, from the EVC XMDS, the mapping information corresponding to the user selection input, and transmit, to the EVC client, the mapping information corresponding to the user selection input, wherein the mapping information configure the EVC client to receive contents corresponding to the mapping information from an external server.

18. The EVC server of claim 17, wherein, if the user selection input is a next menu selection, the first request message requests a next menu page uniform resource locator (URL) corresponding to the user selection input, and the mapping information comprises the next menu page URL.

19. The EVC server of claim 17, wherein, if the user selection input is for a visual call request, the first request message requests information of an IVR landing page link corresponding to the user selection input, and the mapping information comprises the information of the IVR landing page link.

20. The EVC server of claim 17, wherein the controller is further configured to:

receive, from the EVC client, information of an enriched call with another EVC client in relation to a browsed content, and transmit, to the another EVC client, the information of the enriched call.

* * * * *